United States Patent [19]  
Bastien et al.

[11] Patent Number: 5,797,798  
[45] Date of Patent: Aug. 25, 1998

[54] CONSTANT VELOCITY UNIVERSAL JOINT

[75] Inventors: Denis Bastien, Haguehau; Pierre Alber, Reichshofen, both of France

[73] Assignee: Ina Wälzlager Schaeffler KG, Herzogenaurach, Germany

[21] Appl. No.: 836,277

[22] PCT Filed: Aug. 31, 1995

[86] PCT No.: PCT/EP95/03420  
§ 371 Date: Apr. 30, 1997  
§ 102(e) Date: Apr. 30, 1997

[87] PCT Pub. No.: WO96/15384  
PCT Pub. Date: May 23, 1996

[30] Foreign Application Priority Data  
Nov. 9, 1994 [DE] Germany .............. 44 39 965.0

[51] Int. Cl.$^6$ .................................................. F16D 3/205
[52] U.S. Cl. ..................... 464/111; 464/123; 464/905
[58] Field of Search ......................... 464/111, 120, 464/123, 124, 132, 905, 122

[56] References Cited  
U.S. PATENT DOCUMENTS

| | | | |
|---|---|---|---|
| 4,578,048 | 3/1986 | Hirai et al. | 464/111 |
| 4,891,035 | 1/1990 | Sasaki et al. | 464/111 |
| 4,971,595 | 11/1990 | Sasaki et al. | 464/123 |
| 5,137,496 | 8/1992 | Sasaki et al. | 464/123 |
| 5,171,185 | 12/1992 | Schneider | 464/111 |
| 5,376,049 | 12/1994 | Welschof et al. | 464/111 |
| 5,525,109 | 6/1996 | Hofmann et al. | 464/111 |

FOREIGN PATENT DOCUMENTS

| | | |
|---|---|---|
| 41 10 311 | 10/1991 | Germany . |
| 40 39 597 A1 | 6/1992 | Germany . |
| 43 01 207 | 6/1994 | Germany . |
| 43 43 096 | 7/1995 | Germany . |
| 2 259 557 | 3/1993 | United Kingdom . |

Primary Examiner—Randolph A. Reese  
Assistant Examiner—Eileen A. Dunn  
Attorney, Agent, or Firm—Henry M. Feiereisen

[57] ABSTRACT

A constant velocity universal joint of a tripod type includes an outer joint part with three circumferentially spaced axial guide tracks for respectively receiving a tripod unit which is connected to a tripod spider and guided on a ball-headed pin for angular mobility. The a tripod unit (1) includes a form-fitting coupling directly between the tripod roller (6) and an inner ring (4), with the inner ring (4) having an annular shoulder (16) which has an end face bearing upon the tripod roller (6).

7 Claims, 1 Drawing Sheet

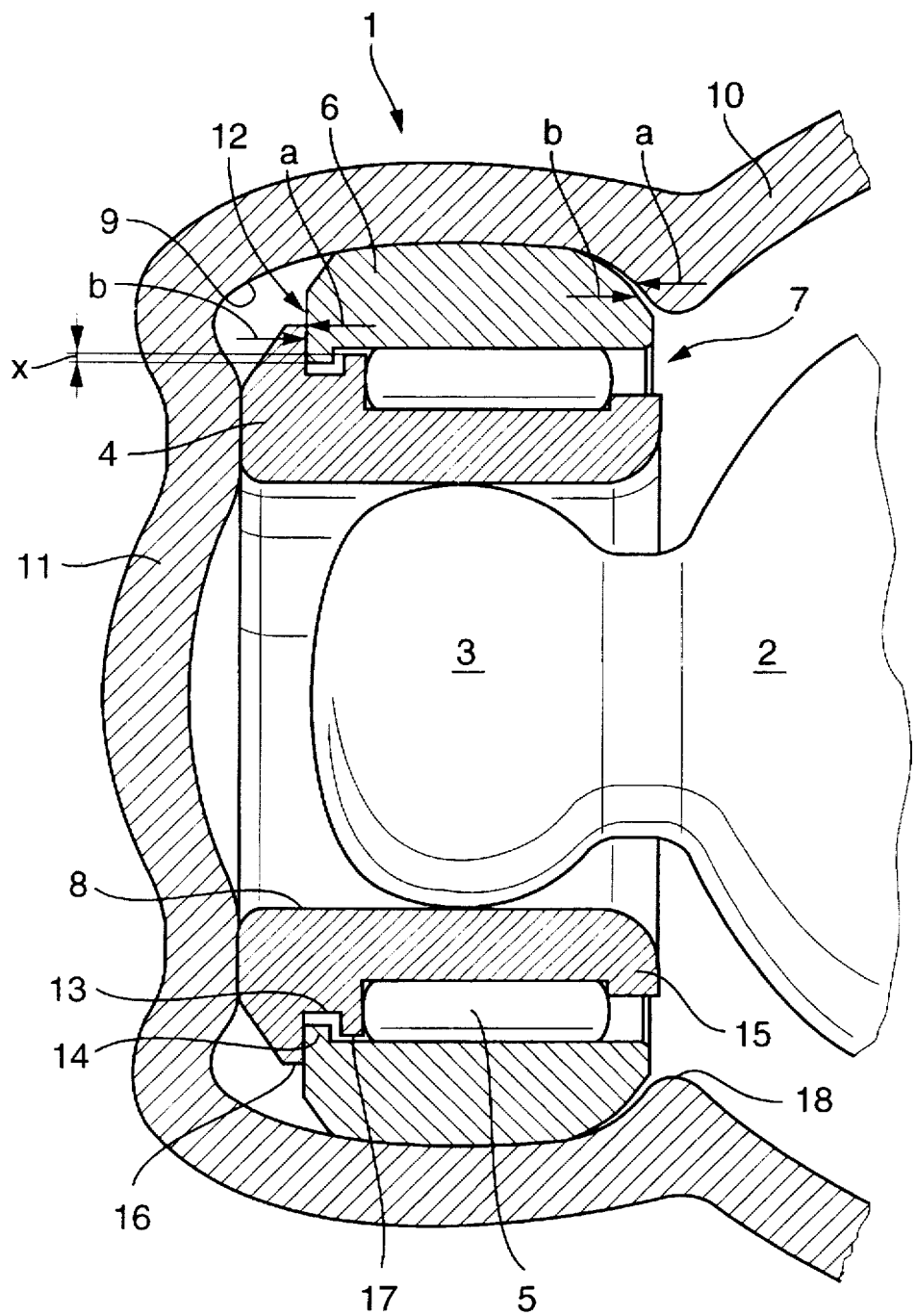

CONSTANT VELOCITY UNIVERSAL JOINT

BACKGROUND OF THE INVENTION

The invention relates to a constant velocity universal joint of the tripod type, having an outer joint part formed with circumferentially spaced axial guide tracks in parallel disposition, and a tripod spider which has arranged thereon symmetrically spaced radial ball-headed pins, with each ball-headed pin being associated to a joint bearing which includes an anti-frictionally mounted tripod roller rotatably supported by rolling elements upon an inner ring on which ball-headed pin is guided for angular movement.

A constant velocity universal joint of this type is known, for example, from FIG. 2 of DE-A 40 39 597, with the inner ring being axially secured in the guide track of the outer joint element. The tripod roller which is rotatably supported on the inner ring by rolling elements is supported on one side by a collar of the inner ring and includes on the side facing away from the collar an axial securement in the form of a retainer ring and a stop disk. This construction which requires a great number of parts, can cause tilting of the outer ring in the guide track, together with a disadvantageous excitation of vibrations of the entire universal joint. In addition, the axial securement of the tripod roller by means of a retainer ring does not provide a permanent solution, since the retainer ring is not able to withstand peak loads.

SUMMARY OF THE INVENTION

It is therefore an object of the invention to provide a constant velocity universal joint which ensures a permanent load support between the components of the constant velocity universal joint;

which ensures an effective securement against loss between the inner ring and the tripod roller, without additional parts;

which exhibits a reduced number of components; and which can be assembled in a simplified and cost-efficient manner.

This object is achieved according to the invention by providing a form-fitting coupling directly between the tripod roller and the inner ring. Advantageously, these components are thereby effectively secured with respect to each other, without the need for additional elements, such as, for example, a stop disk and a retainer ring. The configuration according to the invention also ensures a securement of the rolling elements so that the entire joint bearing, comprised of the inner ring, the rolling elements and the tripod roller, is held together, thereby enabling a mounting of a preassembled joint bearing on a tripod spider in a time-saving and cost-efficient manner, and an installation of the tripod spider with several universal joint bearings into the outer joint part. In order to effect a permanent support between the tripod roller and the inner ring, the inner ring is provided in accordance with the invention on its side facing away from the tripod roller with an annular shoulder which bears with its end face upon the tripod roller, thereby forming a relatively large contact surface. This configuration according to the invention together with a construction of the tripod unit in which the inner ring bears on one side of the guide track and the tripod roller bears on the opposite side of the guide track against the outer joint part, effects a direct load support between the inner ring and the tripod roller, regardless of the direction of an applied axial force. The constant velocity universal joint according to the invention advantageously reduces the excitation of characteristic vibrations, in particular as a result of the decreased number of components; so that vibrations transmitted to the vehicle are also reduced and the driving comfort is improved.

According to another feature of the present invention, an elastic latching mechanism is provided for creating a form-fitting coupling between the inner ring and the tripod roller, with the inner ring being formed with a circumferential annular groove which is laterally offset with respect to the track of the rolling elements for locked engagement of a collar disposed on the tripod roller.

Preferably, the latching mechanism is advantageously disposed adjacent to the annular shoulder on the side of the joint bearing facing away from the tripod spider. This positional conformity promotes a desired enlarged support surface between the inner ring and the tripod roller, as a result of the collar of the tripod roller projecting into the annular groove.

It is suitable, to so configure the annular groove and the collar which form a latching mechanism, that the width of the collar is smaller than the width of the annular groove, thereby effecting a required relative movement and thus axial adjustibility between the tripod roller and the inner ring in the guide track of the outer joint part.

In accordance with another feature of the present invention, the dimension of a radial overlap of the latching mechanism between the collar, which laterally bounds the annular groove, and the collar of the tripod roller is situated between 0.005 and 0.05 mm. The radial overlap can be overcome by either exploiting the elasticity of the tripod roller, or by heating the tripod roller or cooling the inner ring, i.e. through exploitation of the expansion or contraction, as the case may be, of the material. As a result of the small overlap, which is provided solely for effecting a safeguard against loss, already the application of a relatively small axial force between the inner ring and the tripod roller results in a latching action. In order to simplify a latching action, the outside of the collar of the annular groove is chamfered on the side facing the rolling elements, enabling the collar of the tripod roller to latch more rapidly in the annular groove.

According to yet another feature of the present invention, the rolling elements are axially guided on the inner ring. For this purpose, the inner ring is provided on both sides with radially outwardly directed collars to effect an axial securement of the rolling elements, without any additional measures.

According to still another feature of the present invention, when the joint bearing is installed, the inner ring is axially supported on the outer joint part by an annular surface. The tripod roller, on the other hand, is axially restrained by a lateral collar of the guide track in the outer joint part.

Suitably, provides that the tripod unit according to the invention is inserted into an outer joint part in the form of a forged part, a cast part or a turned part. Alternatively, the outer joint part can also be manufactured in, non-cutting manner through a deep-drawing process. The inner ring according to the invention, on the other hand, is a forged or a turned part.

BRIEF DESCRIPTION OF THE DRAWING

An exemplified embodiment of the invention will now be described hereinafter in greater detail with reference to the accompanying drawing in which the sole FIGURE shows a partial cross sectional view of a constant velocity universal joint according to the present invention.

DETAILED DESCRIPTION OF A PREFERRED EMBODIMENT

The sole FIGURE depicts a partial area of a constant velocity universal joint according to the invention, illustrating a tripod unit 1 in an installed position. The tripod unit 1 includes a tripod spider 2 which has three ball-headed pins 3 spaced symmetrically about the circumference, with each of the ball-headed pins 3 engaging in an inner ring 4 which, in conjunction with the rolling elements 5 and a tripod roller 6 formed as an outer ring, forms a joint bearing 7. As a consequence of the dome-shaped ball-headed pin 3 which bears upon an inner contour 8 of the inner ring 4 while being connected to the tripod spider 2, the constant velocity universal joint is adapted for axial and angular movements. Each tripod roller 6 is inserted in axially extending guide tracks 9 located in an outer joint part 10 and disposed in opposing arrangement in circumferential direction.

The outer joint part 10 formed as a cast, forged, turned or sheet metal part has three reception areas for the tripod roller 6 in the form of guide tracks 9 spaced symmetrically about the circumference for guidance of the joint bearing 7. In order to provide a form-fitting connection between the tripod roller 6 and the inner ring 4, these components have a latching mechanism 12 on the side of the joint bearing 7 facing the side wall 11 of the outer joint part 10, with the inner ring 4 having a circumferential annular groove 13 for engagement by a collar 14 of the tripod roller 6. This latching mechanism 12 serves as a securement against loss and as a mounting aid, by which mechanism all components, including the rolling elements 5 of the joint bearing 7 are held together, thereby enabling a simplified, cost-efficient installation. The radial overlap "x" between the collar 17, which laterally bounds the annular groove 13, and the collar 14 of the tripod roller 6 measures between 0.005 and 0.05 mm. The latching mechanism 12 is facilitated by providing the outside of the collar 17 with a circumferential chamfer on the side facing the rolling elements 5.

In order to enable an axial mobility between the inner ring 4 and the tripod roller 6, the width of the collar 14 is considerably smaller than the width of the annular groove 13. For guiding the rolling elements 5, the side of the inner ring 4 facing the tripod star 2 is provided with a radially outwardly directed collar 15 forming an axial limit for the rolling elements 5. Furthermore, the inner ring 4 has an annular shoulder 16 which supports one end face of the tripod roller 6, i.e. a relatively large contact surface is formed between both components. The formation of an annular flange on the joint bearing 7, in conjunction with the form-fitting guidance provided by the inner contour 9 wherein one side of the tripod roller 6 bears upon a collar 18 of the outer joint part 10 and the end face of the inner ring 4 bears upon the outer surface 11, has the effect that regardless of any transverse or axial force which is introduced onto the tripod roller 6 or the inner ring 4 via the outer joint part 10, the load is directly supported by the neighboring component in the joint bearing 7. According to the invention, no separate component is required therefore. To make things more clear, the support zones and support surfaces are marked by arrows. The arrows labeled by character "a" indicate a force directed away from the tripod spider 2, whereas the arrows labeled by character "b" indicate a force directed towards the tripod spider 2.

What is claimed is:

1. A constant velocity universal joint, including an outer joint part (10) formed with circumferentially spaced axial guide tracks (9) in parallel disposition, and a tripod spider (2) which has arranged thereon symmetrically spaced radial ball-headed pins (3), with each of the ball-headed pin (3) being associated to a joint bearing (7) which includes an anti-frictionally mounted tripod roller (6) bearing upon the guide track (9) and rotatably supported by rolling elements upon an inner ring (4) on which the ball-headed pin (3) is guided for angular mobility wherein the inner ring (4) is provided on a side facing away from the tripod spider (2) with an annular shoulder (16) which has an end face bearing upon the tripod roller (6), said inner ring (4) being provided with a circumferential annular groove (13) adjacent to the annular shoulder (16) for captivating a collar (14) of the tripod roller (6), thereby forming an elastic latching mechanism (12) between the tripod roller and the inner ring.

2. A constant velocity universal joint of claim 1 wherein the tripod roller (6) has a collar (14) of a width which is smaller than a width of the annular groove (13).

3. The constant velocity universal joint of claim 1 wherein the inner ring (4) is formed with a first collar (17), which laterally bounds the annular groove (13), with a radial overlap being provided between the collar (17) and the collar (14) of the tripod roller (6), measuring between 0.05 and 0.005 mm.

4. The constant velocity universal joint of claim 3 wherein the inner ring (4) is formed with a further collar (17) on a side facing the tripod spider, said rolling elements (5) being axially restricted by the collars (15, 17) of the inner ring (4).

5. The constant velocity universal joint of claim 1 wherein the outer joint part (10) is formed with a collar (18), said tripod roller (6) in its installed position bearing in a form-fitting manner upon the collar (18) of the outer joint part (10), with said inner ring (4) being supported by a side wall (11) of the outer joint part (10).

6. The constant velocity universal joint of claim 1 wherein the outer joint part (10) is formed as an element selected from the group consisting of forged part, cast part and turned part, and that the inner ring (4) is an element selected from the group consisting of forged part and turned part.

7. The constant velocity universal joint of claim 1 wherein the outer joint part (10) is made in a non-cutting manner through a deep-drawing process.

* * * * *